United States Patent [19]
Adams, Jr. et al.

[11] Patent Number: 5,205,807
[45] Date of Patent: Apr. 27, 1993

[54] APPARATUS AND METHOD FOR FORMING HINGED TOP CIGARETTE BOX

[75] Inventors: Jonah Adams, Jr., Chesterfield; John Tomanovits, Richmond; Duane C. Wilder, Chesterfield, all of Va.

[73] Assignee: Philip Morris Incorporated, New York, N.Y.

[21] Appl. No.: 851,227

[22] Filed: Mar. 12, 1992

Related U.S. Application Data

[63] Continuation of Ser. No. 568,351, Aug. 15, 1990, abandoned.

[51] Int. Cl.$^5$ ............................ B31B 1/34; B31C 1/00
[52] U.S. Cl. ..................................... 493/125; 493/175; 493/295; 493/304; 493/911
[58] Field of Search ............... 493/125, 126, 127, 164, 493/175, 295, 303, 304, 911

[56] References Cited

U.S. PATENT DOCUMENTS

| Re. 29,568 | 3/1978 | Braun .............................. 156/580.2 |
| 989,789 | 4/1911 | Maxwell ............................. 493/295 |
| 1,284,583 | 11/1918 | Burgess ............................. 493/175 |
| 1,905,334 | 4/1933 | Bicker . |
| 2,484,076 | 10/1949 | Collins ............................... 493/303 |
| 2,630,047 | 3/1953 | Rowlands .......................... 493/295 |
| 3,956,975 | 5/1976 | Egleston et al. .................... 93/49 M |
| 3,437,257 | 4/1969 | Bua . |

(List continued on next page.)

FOREIGN PATENT DOCUMENTS

| 0038488 | 10/1981 | European Pat. Off. . |
| 0269476 | 6/1983 | European Pat. Off. . |
| 0142557 | 11/1985 | European Pat. Off. . |
| 0167645 | 1/1986 | European Pat. Off. . |
| 2032184 | 2/1971 | Fed. Rep. of Germany . |
| 2833577 | 2/1980 | Fed. Rep. of Germany . |
| 2165370 | 8/1973 | France . |
| 1264589 | 2/1972 | United Kingdom . |
| 1306676 | 2/1973 | United Kingdom . |

OTHER PUBLICATIONS

Gary Flood, "Ultrasonic Energy, A Process For Laminating and Bonding Nonwoven Web Structures", 12th Technical Symposium—Association of the Nonwoven Fabrics Industry, Washington, D.C. pp. 90-103, May 22-23, 1984.

Steven T. Gallagan, "Material And Additive Factors In Ultrasonic Assembly", ANTEC '85, pp. 850-854.

Steven T. Gallagan, "Laying The Groundwork For Ultrasonic Welding", Plastics Engineering, pp. 35-37, Aug. 1985.

W. Land, "Investigations Into The Process Of Ultrasonic Welding", Kunst Ger. Plast., pp. 16-18, Apr. 1978.

A. Shoh, "Welding of Thermo-plastics By Ultrasound", Ultrasonics, Sep. 1976, England, pp. 209-216.

Fred V. Vitale, "Today's Uses of Ultrasonics In Medical Device Manufacturing", J. Wolcott, "Recent Advances In Ultrasonic Technology", Plastics Create A World Of Difference—Proceedings Of The SPE 47th Annual Technical Conference & Exhibits: ANTEC '89, pp. 502-506.

Constance Carlson, "Ultrasonic Assembly of Plastic Medical Devices", Medical Device and Diagnostic Industry, Mar. 29, 1984, pp. 32-35.

Primary Examiner—William E. Terrell
Attorney, Agent, or Firm—Charles B. Smith; Nicola A. Pisano

[57] ABSTRACT

An apparatus for forming a hinged top cigarette box having a cross-section with one or more arcuate surfaces from a one piece blank, the apparatus comprising a mandrel that engages the one piece blank along an edge, and which mandrel rotates to wrap the blank around the mandrel to form a hinged top cigarette box having inner and outer walls. Alternative embodiments of the apparatus may include either an ultrasonic device or wet adhesives to secure the inner and outer walls of the box in proper relation. A method is provided for forming a dual layer hinged top cigarette box having a cross-section with one or more arcuate surfaces wherein a box blank is engaged along one end and then rotated and secured so that the resulting box has its inner and outer layers fixed in proper relation.

24 Claims, 7 Drawing Sheets

U.S. PATENT DOCUMENTS

| | | | |
|---|---|---|---|
| 3,807,288 | 4/1974 | Niepmann | 93/12 C |
| 3,852,144 | 12/1974 | Parry . | |
| 3,863,552 | 2/1975 | Gabarro . | |
| 3,926,098 | 12/1975 | Smith | 493/295 |
| 3,929,271 | 12/1975 | Meyers . | |
| 4,008,651 | 2/1977 | Pain | 493/295 |
| 4,033,241 | 7/1977 | Roda | 493/295 |
| 4,034,538 | 7/1977 | Schmermund . | |
| 4,072,089 | 2/1978 | Bosche | 93/44.1 GT |
| 4,079,575 | 3/1978 | Focke et al. . | |
| 4,084,393 | 4/1978 | Focke . | |
| 4,159,220 | 6/1979 | Bosch et al. | 156/73.1 |
| 4,179,864 | 12/1979 | Focke . | |
| 4,183,457 | 1/1980 | Loughley et al. . | |
| 4,188,024 | 2/1980 | Seragnoli . | |
| 4,241,560 | 12/1980 | Deimel et al. | 53/373 |
| 4,258,526 | 3/1981 | Focke . | |
| 4,308,708 | 1/1982 | Focke . | |
| 4,334,875 | 6/1982 | Eckert | 493/303 |
| 4,349,345 | 9/1982 | Bodendoerfer . | |
| 4,441,948 | 4/1984 | Gilliard et al. | 493/303 |
| 4,444,308 | 4/1984 | MacEwen . | |
| 4,548,019 | 10/1985 | Kruse . | |
| 4,559,758 | 12/1985 | Gamberini . | |
| 4,592,190 | 6/1986 | Sherman et al. . | |
| 4,596,112 | 6/1986 | Buckley et al. . | |
| 4,606,462 | 8/1986 | Bogren . | |
| 4,612,756 | 9/1986 | Focke et al. . | |
| 4,655,738 | 4/1987 | Jansson | 493/304 |
| 4,747,894 | 5/1988 | Johnston et al. . | |
| 4,750,607 | 6/1988 | Focke . | |
| 4,750,955 | 6/1988 | Haguenier | 156/69 |
| 4,790,115 | 12/1988 | Focke . | |
| 4,834,234 | 5/1989 | Sacherer et al. . | |
| 4,840,007 | 6/1989 | Focke et al. . | |
| 4,843,800 | 7/1989 | Focke . | |

APPARATUS AND METHOD FOR FORMING HINGED TOP CIGARETTE BOX

This is a continuation of application Ser. No. 07/568,351, filed Aug. 15, 1990, abandoned, entitled APPARATUS AND METHOD FOR FORMING HINGED TOP CIGARETTE BOX.

BACKGROUND OF THE INVENTION

The present invention relates to an apparatus for forming a hinged top cigarette box. More particularly, this invention relates to an apparatus for forming a hinged top cigarette box having a cross-section with one or more arcuate surfaces from a one piece blank.

A method is also provided for forming such cigarette boxes by engaging the one piece blank with a mandrel, and then rotating the mandrel to align portions of the blank to create inner and outer layers of the resulting box. The wound layers of the box are secured in proper relation using one of several alternative sealing means.

One means of packaging cigarettes is to use a hard, paperboard box. Typically, the box contains a foil wrapped cigarette bundle and has a hinged lid at the top. In addition, the typical hinged top box has hard corners which are necessary for the box to hold its shape.

Many smokers prefer a hinged top cigarette box because such a box can be reclosed to prevent loose tobacco from dropping out and offers better protection for the cigarettes within it. Typical hinged top cigarette box designs only allow for an angular shaped profile and generally have imperfect miter alignment between the top and the body. As a result, a novel hinged top cigarette box having a rounded profile has been designed. See U.S. Pat. No. 4,923,059. Such a hinged top cigarette box is formed from a one piece blank. However, standard hinged top cigarette box apparatuses are inadequate for forming a hinged top cigarette box having a circular, oval, elliptical or other cross-sectional shape having one or more arcuate surfaces from a one-piece blank as shown in U.S. Pat. No. 4,923,059.

It would therefore be desirable to provide an apparatus for forming hinged top cigarette boxes having a cross-section with one or more arcuate surfaces.

It would also be desirable to provide an apparatus for forming hinged top cigarette boxes from a one piece blank.

It would further be desirable to provide a method for forming a hinged top cigarette box from one piece blank, wherein the one piece blank is manipulated so that a first portion of the one piece blank serves as an inner sleeve and a second portion of the blank serves as an outer sleeve and hinged top of the cigarette box.

SUMMARY OF THE INVENTION

It is therefore an object of this invention to provide an apparatus for forming hinged top cigarette boxes having a cross-section with one or more arcuate surfaces.

It is also an object of this invention to provide an apparatus for forming hinged top cigarette boxes from a one piece blank.

It is a further object of this invention to provide a cigarette box forming apparatus which forms a dual layer box from a one piece blank, wherein apparatus disposes the inner and outer layers of the box in a desired predetermined relation.

It is a yet another object of this invention to provide a method for forming a dual layer cigarette box wherein a one piece box blank is engaged by a mandrel and rotated to bring the respective inner and outer portions of the box into a desired predetermined relation, and for sealing the seams thereof.

It still another object of this invention to provide a method for forming a hinged top cigarette box from one piece blank, wherein the one piece blank is manipulated so that a first portion of the one piece blank serves as an inner sleeve and a second portion of the blank serves as an outer sleeve and hinged top of the cigarette box.

In accordance with the invention, there is provided an apparatus for forming hinged top cigarette boxes having a cross-section with one or more arcuate surfaces from a one piece blank. The one piece blanks, which may be laminated paperboard or plain stock are supplied to a mandrel. One end of the blank is affixed to the mandrel. When the mandrel is rotated appropriately the blank is formed into a shell having an oval, elliptical or flat oval (similar to a racetrack configuration) cross-sectional shape. The seams of the shell are sealed by means of a dry pre-applied adhesive, which is activated by heat such as provided by an ultrasonic sealing device, or by means of a fast drying wet adhesive to permanently hold the shape of the formed shell. The formed shell is then ejected from the mandrel.

Formation of hinged top cigarette boxes in accordance with the method of the present invention comprises the steps of engaging an edge of a one piece blank and winding the blank so as to form a dual layer shell wherein predetermined inner and outer portions of the box are brought into a desired relation, and sealing the seams of thereof. The method provides for forming a hinged top cigarette box from one piece blank, wherein the blank is manipulated so that a first portion of the one piece blank serves as an inner sleeve and a second portion of the blank serves as an outer sleeve and hinged top of the cigarette box.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figures 1, 6:
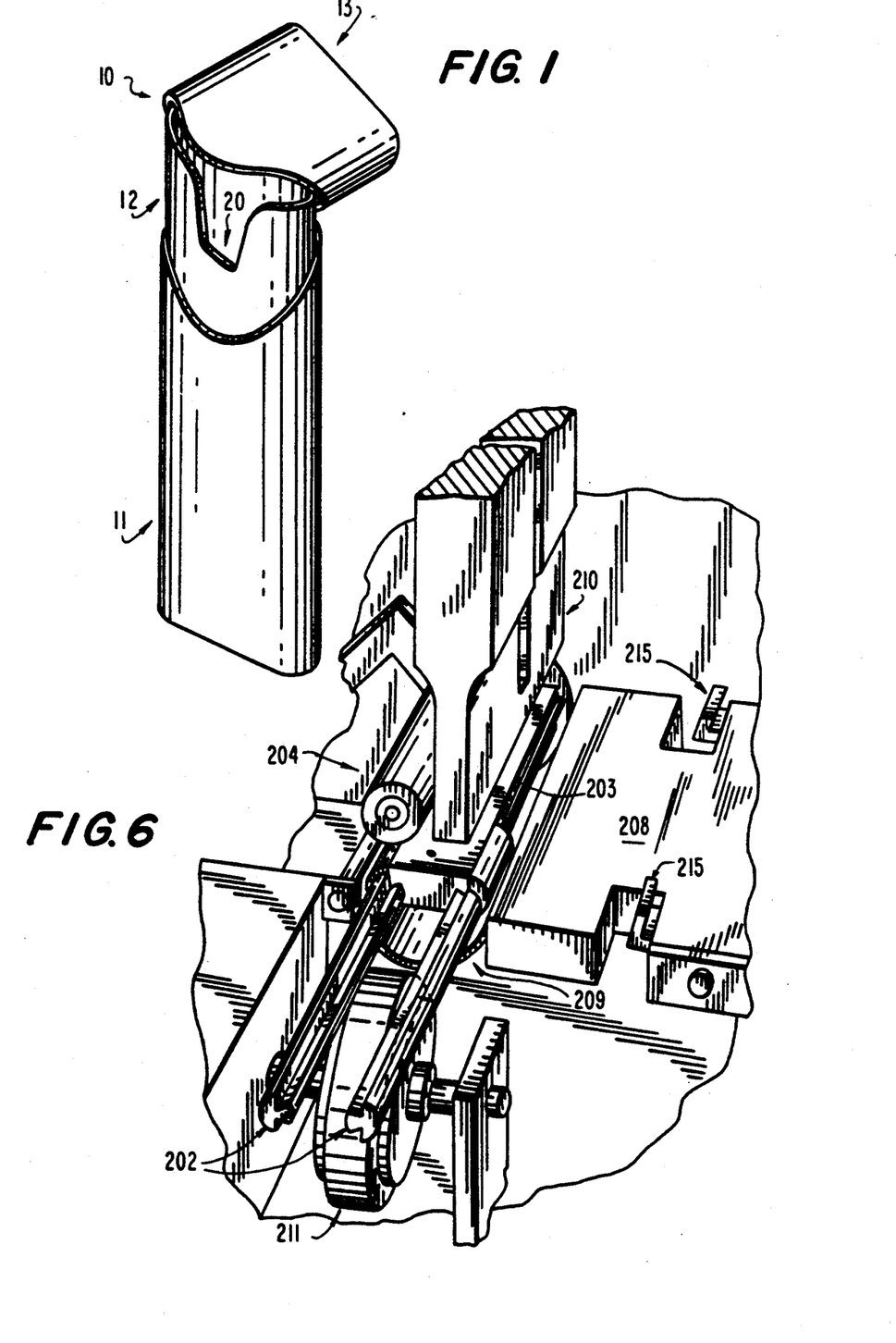
FIG. 1 is a perspective view of a formed hinged top cigarette box made by the present invention.
FIG. 6 is a perspective view of the wrapping and sealing station of the apparatus of the present invention.

Preferably the blank 100 used to form the shell of the hinged top cigarette box 10 is constructed of 12-point paperboard. The paperboard may be laminated or plain stock. As seen in FIG. 1, box 10 comprises an outer sleeve 11, an inner sleeve 12 having a cut-out 20 to facilitate the removal of cigarettes from box 10 and a cover member 13. Box 10 is preferably formed from blank 100 shown in FIG. 2. A detailed description of the hinged top cigarette box formed from a one piece blank by the apparatus of this invention can be found in U.S. Pat. No. 4,923,059 and is incorporated herein by reference. Blank 10 may have dry adhesive applied to selected zones of the surface forming the interior portions of inner sleeve 12 and outer sleeve 11, or a wet adhesive may be applied during the shell forming operation, as described in the incorporated reference.

As shown in FIGS. 3 through 6, one embodiment of the apparatus for forming and sealing blank 100 comprises a hopper 201 for storing a plurality of blanks 100, vacuum rods and suction cups 202 for removing the bottom most blank 100 from hopper 201, a pusher bar 207 and a slide 208 for transferring blank 100 from hopper 201 to a mandrel 203, a pinch roller 204, a support means 205, an ultrasonic sealing device 206, a U-shaped fork 209 and an eject roller 211 for removing the formed shell from mandrel 203.

Figure 3:
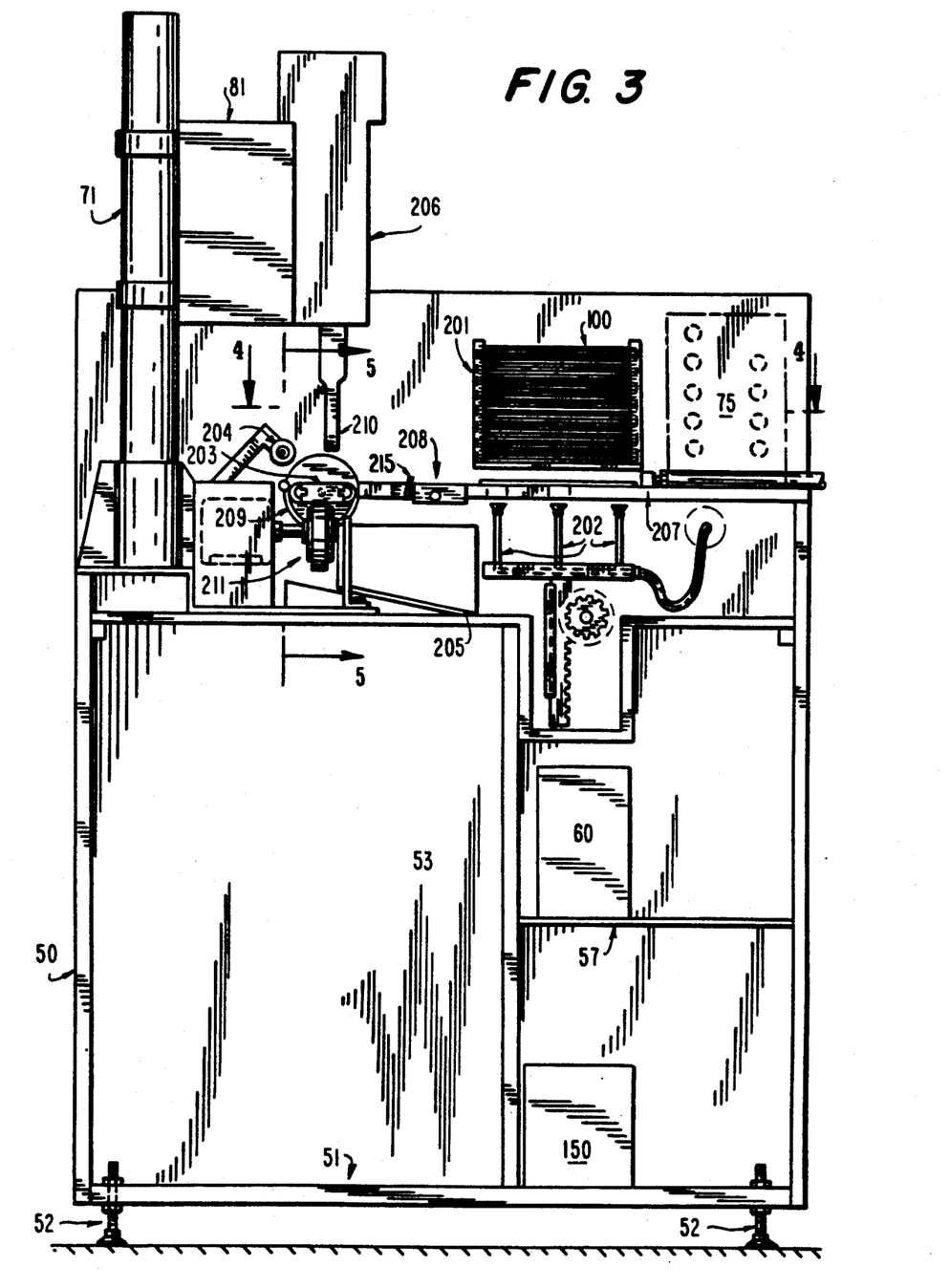
FIG. 3 is a front elevation view of one embodiment of the of this invention.

In addition, the forming and sealing area of the apparatus of this invention is mounted on a rigid frame 50 having a horizontal base member 51 supported on a plurality of adjustable legs 52 and a vertical back wall 53 fixedly secured to base member 51. Frame 50 includes shelf 57 for carrying the control means 60 (obtained from the ultrasonic sealing device manufacturer) associated with the ultrasonic sealing device 206.

Ultrasonic sealing device 206 is adjustably mounted on vertical support arm 71. Support arm 81 of ultrasonic sealing device 206 is mounted to the housing of ultrasonic sealing device 206 provided therewith by the manufacturer. The housing contains electrical apparatus, a converter for converting electrical energy to mechanical energy, i.e. vibration and an acoustical horn 210 (similar in concept to a tuning fork) for transmitting the mechanical energy to the formed shell.

Controller 150, such as a Siemens PLC LOGIC Programmable Controller, is disposed beneath controller means 60 on horizontal base member 51. A control panel 75 which includes push-buttons to activate the apparatus, a reset button, and a safety cut-off switch is used to control the operation of the apparatus of this invention.

Alternatively, when a wet adhesive is used to seal the formed shell, a glue pot 500, a glue roller 510 and a glue dabber 520 are provided and ultrasonic sealing device 206 is not provided. See FIG. 7. In such an embodiment, controller means 60 associated with ultrasonic sealing device 206 would be unnecessary. However, controller 150 and control panel 75 would still be necessary to control the operation of the apparatus of this invention.

Although this invention will be described in terms of forming and sealing a hinged top cigarette box having a cross-section with one or more arcuate surfaces, it is to be understood that this invention can also be used to form a hinged top cigarette box having a rectangular or other multi-sided cross-sectional shape. The shape of the resulting box is determined by the shape of the mandrel.

Hopper 201 carries a load of blanks 100 to be formed into hinged top cigarette boxes. Blank 100 is transferred from hopper 201 to slide 208 by a vacuum exerted through vacuum rods and suction cups 202 on the bottom most blank 100 in hopper 201. The vacuum can be exerted by means of a standard vacuum pump, such as a Gast #DAA-VIII-GB and a Numatics solenoid model M7 11DSA5 46.

Vacuum rods and suction cups 202 can be raised and lowered by means of a first servo motor, such as an Emerson DXM 430S, and rack and pinion combination. The first servo motor is synchronized to rotate the pinion once in one direction and then to rotate the pinion once in the opposite direction. The engagement of the pinion with a rack fixedly connected to the vacuum rods and suction cups 202 causes vacuum rods and suction cups 202 to be raised and lowered when the pinion is rotated.

Initially vacuum rods and suction cups 202 are raised into contact with bottom most blank 100. This allows the combination of the vacuum exerted through the vacuum rods and suction cups 202 to grip bottom most blank 100. The lowering of vacuum rods and suction cups 202 away from hopper 201 toward slide 208 thus brings bottom most blank 100 from hopper 201 to slide 208. A sensing device, such as a Baluff BES-516-122-DO-Y5 proximity switch, determines when vacuum rods and suction cups 202 have been lowered to properly place blank 100 on slide 208. At that point, a solenoid valve is activated to momentarily stop the vacuum from passing through vacuum rods and suction cups 202.

Next, pusher bar 207 advances along slide 208 to push blank 100 along slide 208 toward mandrel 203. A second servo motor, such as an Emerson DXM 430S, is used to rotate another pinion which in turn advances another rack. This rack is connected to pusher bar 207 and causes pusher bar 207 to move along slide 208. The second servo motor is synchronized so that it rotates the pinion once in one direction to cause pusher bar 207 to advance toward mandrel 203. The second servo motor then rotates the pinion once in the opposite direction to cause pusher bar 207 to return to its original position.

Blank 100 is fed toward mandrel 203 by pusher bar 207 so that edge 103 is the leading edge and is perpendicular to the direction of travel. The surface of blank 100 that will be exposed to the smoker once blank 100 is formed into a box should be facing up and away from slide 208 toward hopper 201. Edge 103 of blank 100 should be aligned on mandrel 203 so that edge 103 is parallel to the longitudinal axis of mandrel 203. If edge 103 is not parallel to the longitudinal axis of mandrel 203, the resulting shell will have an undesirable conical cross-section.

Figure 4:
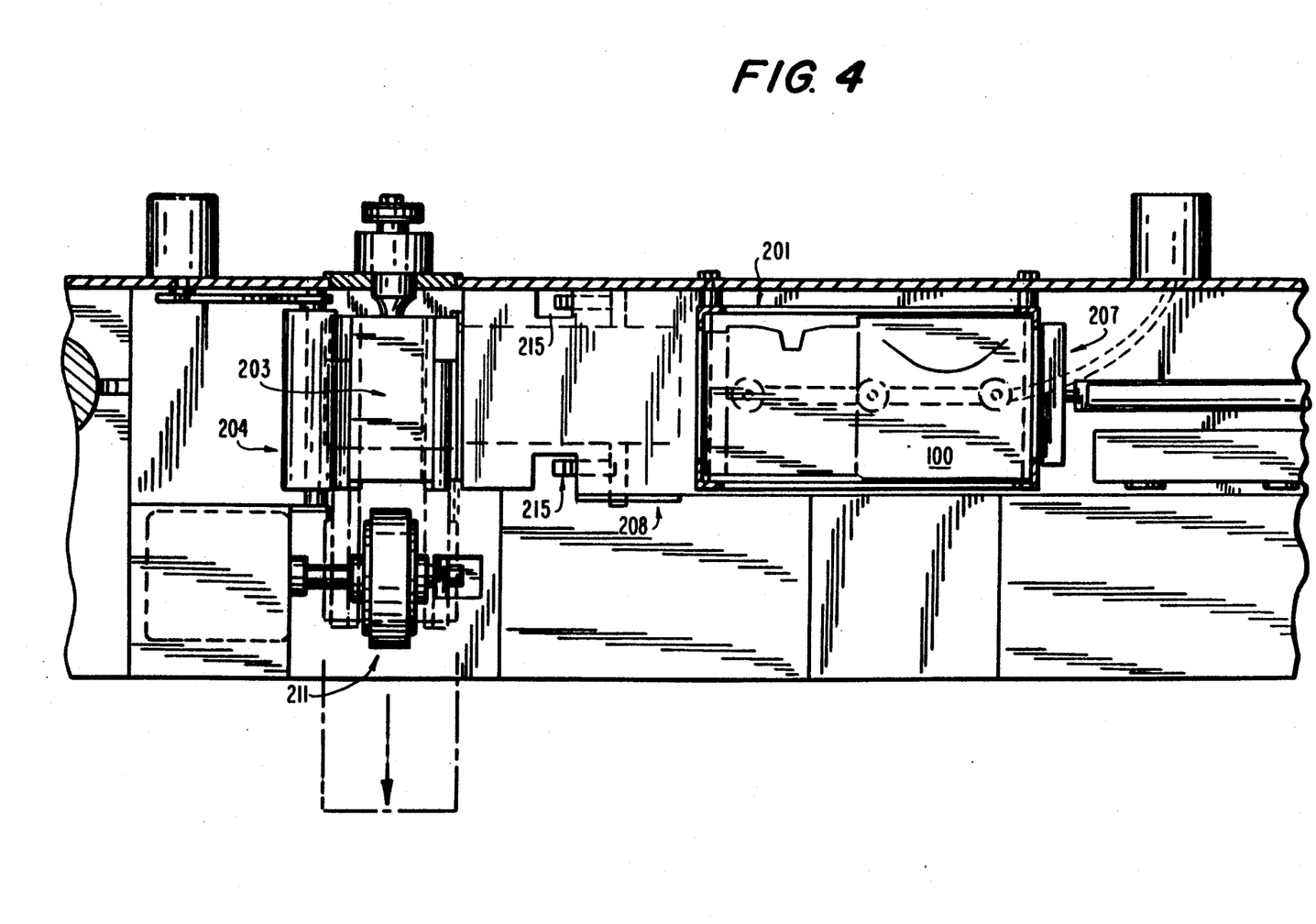
FIG. 4 is a plan view taken along line 4—4 of FIG. 3.
Figure 5:
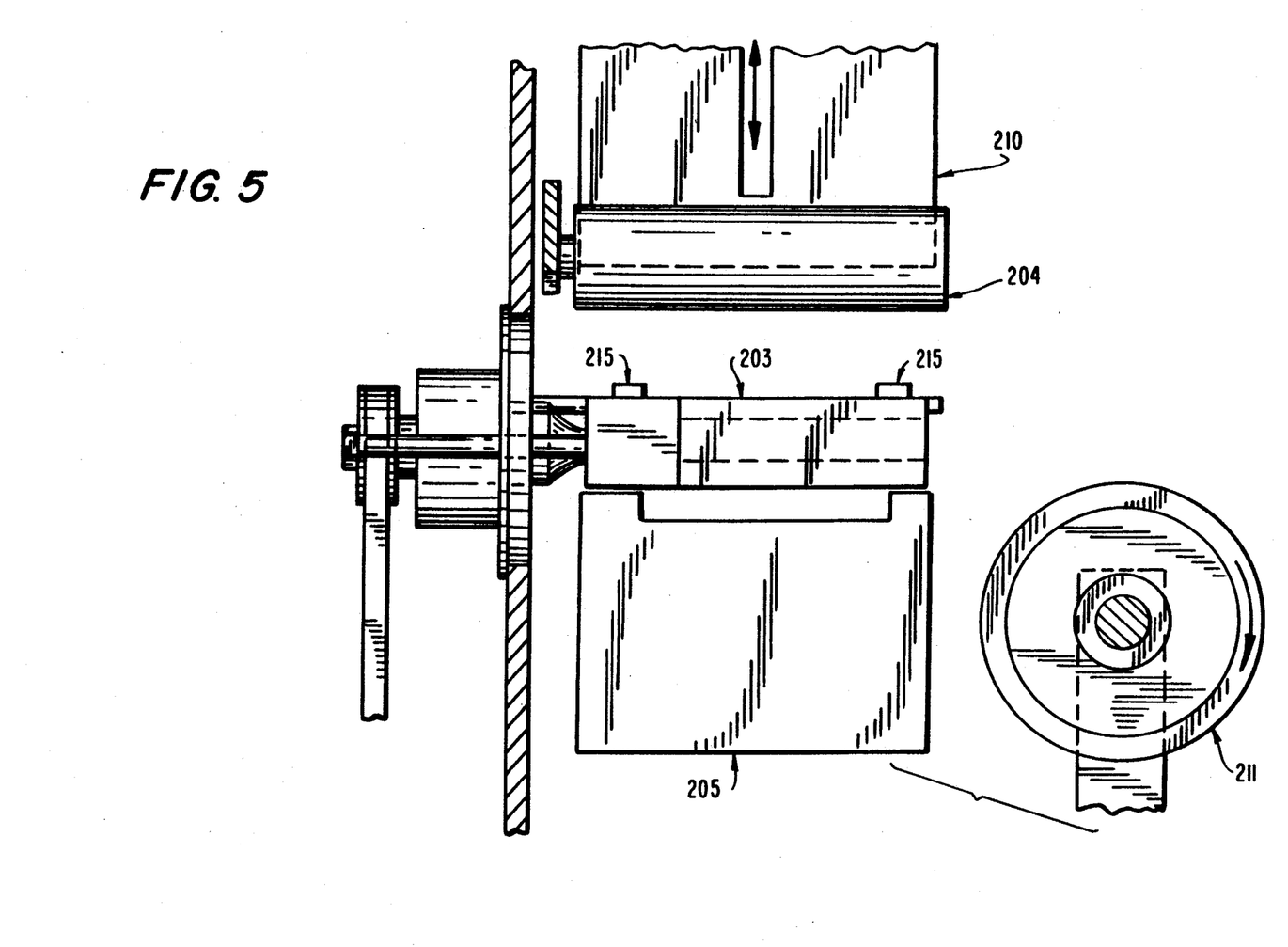
FIG. 5 is a side elevation view taken along line 5—5 of FIG.

In order to ensure that blank 100 is properly aligned on mandrel 203, side guides (not shown) on slide 208 can be used. Alternatively, slide 208 can be properly dimensioned so that as blank 100 is pushed toward mandrel 203, edge 103 remains parallel to the longitudinal axis of mandrel 203. In addition, stops 215 are located on either side of slide 208 to engage the shoulders 118 and 119 of blank 100. Stops 215 are located at a position along slide 208 so that when shoulders 118 and 119 engage stops 215, edge 103 will be properly aligned on the left side of mandrel 203 as seen in FIGS. 3, 4 and 6. The second servo motor and rack and pinion combination are synchronized such that when shoulders 118 and 119 engage stops 215, the pinion is caused to reverse its rotation so that pusher bar 207 retracts to its original position.

To ensure that blank 100 remains properly aligned on mandrel 203 during the folding operation, one side of mandrel 203 has a plurality of vacuum holes and saw teeth located thereon. A vacuum is created inside mandrel 203 by means of a standard vacuum pump, such as a Gast #DAA-VIII-GB and a Numatics solenoid model M7 11DSA5 45. The solenoid is activated once shoulders 118 and 119 engage stops 215. The force created by the vacuum pump holds blank 100 in place along one side of mandrel 203. When the vacuum is activated through the solenoid, pinch roller 204 is rotated into contact with blank 100 along edge 103 on mandrel 203. The pressure exerted by pinch roller 204 causes the saw teeth to bite into blank 100.

Prior to the rotation of mandrel 203, stops 215 must be rotated below the floor of slide 208. This can be accomplished by having stops 215 rotatably connected to a follower which engages an extension bar on the rack used to advance pusher bar 207. As the rack and the extension bar move toward mandrel 203, the follower engages the extension bar causing stops 215 to rotate above the floor of slide 208. When the rack and pusher bar 207 return to the original position the follower disengages from the extension bar causing stops 215 to rotate below the floor of slide 208.

Mandrel 203 rotates two complete revolutions counterclockwise as seen from FIGS. 3, 4 and 6 to form blank 100 into a shell having the shape shown in FIG. 1. Preferably, a third servo motor, such as an Emerson DXM-430S that has been programmed to rotate one complete revolution and a two to one gear ratio is used. Of course, the number of revolutions that mandrel 203 rotates may change if different configurations for a hinged top cigarette box are desired or if different size blanks are used. As mandrel 203 rotates, pinch roller 204 remains in contact with blank 100 on mandrel 203. This ensures that blank 100 is properly wrapped around itself.

Blank 100 is wrapped by mandrel 203 and pinch roller 204 in one continuous motion so that edge 103 abuts with line 112 and edge 104 abuts with line 113. Preferably, score lines 107 and 108 overlap after blank 100 is properly wrapped.

To ensure the formation of a flat oval shaped hinged top cigarette box having proper dimensions, mandrel 203 should be slightly narrower and wider than the shape desired for the finished shell. However, the circumference of mandrel 203 should be about the same as the circumference of the finished shell. Thus, for a flat oval shaped hinged top cigarette box 4.020 inches long, 1.707 inches wide and having curved sides with a 0.322 inch radius of curvature, mandrel 203 should be longer than 4 inches, about 0.438 inches thick, about 1.716 inches wide and have curved sides with a radius of curvature of about 0.219 inches.

This configuration is necessary because blank 100 used to form the hinged top cigarette box has a memory and will try to assume a round configuration after it has been wrapped. Thus by using a mandrel that is narrower and wider than the shape desired for the finished shell, blank 100 will assume the desired shape for the finished shell after it has been ejected from mandrel 203. For blanks of different materials, the dimensions of mandrel 203 will change in correspondence with the memory of the blank material.

Once wrapped, blank 100 is then sealed so the resulting hinged top cigarette box will hold its shape. One means of sealing blank 100 is by using a dry adhesive in combination with a means for producing heat to activate the dry adhesive, such as ultrasonic sealing device 206. Preferably ultrasonic sealing device 206 is a 900 SERIES manufactured and marketed by Branson Ultrasonics Corporation. The vibration from acoustical horn 210 manifests itself as heat induced by friction and pressure between the pieces to be joined thus activating the pre-applied dry adhesive.

Control means 60 is used to ensure that a proper seal is provided by ultrasonic sealing device 206. Control means 60 monitors how much time and energy has been expended by ultrasonic sealing device 206 to seal the shell. These values are compared to the desired values stored in the memory of control means 60. In this manner, control means 60 can alert the operator of an improper seal or other abnormal condition.

Preferably a dry adhesive such as one manufactured by Pierre Stevens and known as Latisel A7734A is used. This adhesive is activated at a temperature of less than about 200° F. A thin, uniform amount of this dry adhesive is preferably applied to blank 100 prior to blank 100 being loaded into hopper 201. Preferably the dry adhesive should be applied on blank 100 in the area bounded by edge 104 and line 114 and the area bounded by lines 112 and 113 on the inside surface of blank 100, i.e., the side opposite to that which will be exposed to the smoker when a hinged top cigarette box is formed from blank 100.

Ultrasonic sealing device 206 uses a specially shaped acoustical horn 210 to contact only the area of the surface to be sealed. Preferably the portion of acoustical horn 210 that contacts the formed shell on mandrel 203 is rectangular and is about 4 inches long and about 0.5 inches wide. By applying the dry adhesive to blank 100 in the locations described above, the two areas on which the dry adhesive is applied will be aligned once blank 100 is properly wrapped on mandrel 203. Thus, when acoustical horn 210 of ultrasonic sealing device 206 comes in contact with the formed shell on mandrel 203 to seal the formed shell, acoustical horn 210 activates the dry adhesive in both locations.

During the sealing process ultrasonic sealing device 210 applies about 50 to about 70 pounds of pressure to the formed shell and mandrel 203. In order to withstand this pressure, support device 205 is moved into position under mandrel 203 by the first servo motor and a rack and pinion combination. Support device 205 is used to support mandrel 203 during the sealing operation after mandrel 203 has completed its two revolutions.

Support device 205 can take on any configuration as long as it provides the necessary support to mandrel 203 when ultrasonic sealing device 206 is applying pressure. Preferably support device 205 comprises two top rails which contact the bottom of mandrel 203 at positions where blank 100 is not wrapped around mandrel 203. This will avoid the creation of indentations in the shell caused by the pressure exerted by ultrasonic sealing device 206.

In addition, ultrasonic sealing device 206 should be angled right of vertical, as seen from FIG. 3, about one degree. This angle of engagement between mandrel 203 and acoustical horn 210 of ultrasonic sealing device 206 avoids the creation of any noticeable indentations and marks on the formed shell by the pressure exerted by ultrasonic sealing device 206.

Conventional load cells, which are supplied by the ultrasonic sealing device manufacturer, measure the load exerted by acoustical horn 210 on the formed shell until a preselected load is obtained. At that point, the converter of ultrasonic sealing device 206 is activated. When the converter is activated, control means 60 monitors the duration and magnitude of energy input to the formed shell to assure that the energy and time parameters are within predefined acceptable ranges.

To properly seal blank 100 once it is properly wrapped, ultrasonic sealing device 206, operating at a frequency of 20 kHz, should contact the formed shell for about 0.15 seconds. This is enough to deposit a total energy of about 30 to about 40 Joules and obtain sufficient melting of the dry adhesive. The molten adhesive almost instantaneously cools to provide a durable bond.

Once the predetermined energy deposition and duration have been achieved, acoustical horn 210 is retracted, support device 205 is retracted, pinch roller 204 is retracted and the formed shell is ejected from mandrel 203. A proximity switch, such as a Baluff #BES 516-122-DO-Y5, senses when acoustical horn 210 is retracted to signal when ejection of the formed shell should take place. If an abnormal condition has occurred or the parameters have exceeded the acceptable ranges, controller 150 can sound an alarm and cancel the signal which ejects the shell from mandrel 203.

It is to be understood that the parameters used for ultrasonically sealing other combinations of materials and adhesives will require different time and total energy deposition ranges. However, such parameters can be easily ascertained by conducting parametric evaluations of sample runs as is well known to those in the packaging field.

The formed shell is ejected from mandrel 203 by means of U-shaped fork 209 fixedly engaged with the rear end of side pieces 220 which comprise a part of mandrel 203. Side pieces 220 are slidingly connected at either side of a central core and together comprise mandrel 203. An air cylinder and U-shaped fork 209 are used to push side pieces 220 along the length of mandrel 203. Since the formed shell is frictionally engaged with side pieces 220 after being wrapped around mandrel 203, the movement of side pieces 220 causes the shell to travel with side pieces 220 toward the end of mandrel 203. Eject roller 211, rotating in the direction of the movement of the shell, engages the formed shell to pull the formed shell from mandrel 203. The retraction of the air cylinder causes U-shaped fork 209 to pull side pieces 220 back to their original position. The formed shell is not pulled back with side pieces 220 because it has already been pulled off by eject roller 211.

Alternatively, a metal plate (not shown) may be positioned adjacent to where the shell will be positioned after being moved by side pieces 220. This metal plate can be arranged so that it engages with the shell causing the shell to bow and widen thus minimizing the frictional engagement between side pieces 220 and the formed shell.

To facilitate the ejection of the formed shell from mandrel 203, the center core of mandrel 203 is tapered. Thus when side pieces 220 are pushed along the length of mandrel 203, the distance between side pieces 220 decreases minimizing the frictional engagement between side pieces 220 and the formed shell at the point where eject roller 211 engages the formed shell.

After the formed shell is ejected, another blank 100 is slid into position and the process is repeated. Controller 150 is used to synchronize the ejection of a formed shell from mandrel 203 with the advancement of another blank 100 toward mandrel 203 by pusher bar 207. In this way, the process is repeated.

Approximately 30 shells per minute can be made using this embodiment. To increase the output, additional mandrels and ultrasonic sealing devices can be used.

In an alternative embodiment, blank 100 slides by gravity along slide 208a into alignment with mandrel 203a. In this embodiment, a wet adhesive is used to seal blank 100 into the formed shell. See FIG. 7.

Figure 7:
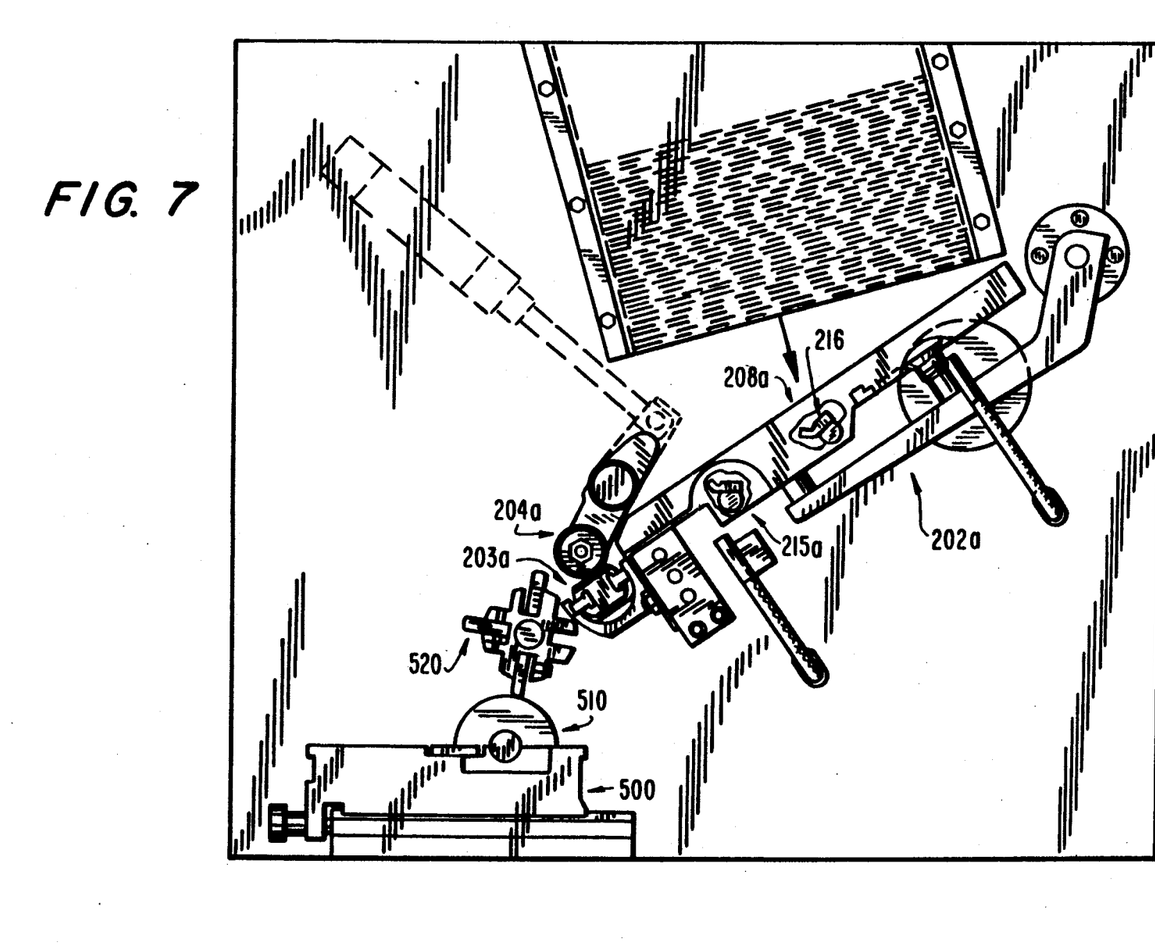
FIG. 7 is a partial front elevation view of a second embodiment of the apparatus of this invention.

Vacuum extracting arm and suction cups 202a rotate into contact with bottom most blank 100 and pull blank 100 onto slide 208a. The rotation of vacuum extracting arm and suction cups 202a is achieved by means of a cam and follower arrangement. A sensing device, such as a Baluff #BES 516-122-DO-Y5 proximity switch, senses the cam used to rotate vacuum extracting arm and suction cups 202a. The cam and the sensing device are synchronized so that the sensing device senses the cam when laminate blank 100 has been placed on slide 208a. At that point, the sensing device signals a solenoid valve which is activated to momentarily prevent the vacuum from being exerted through vacuum extracting arm and suction cups 202a. At this point, blank 100 slides along slide 208a until shoulders 118 and 119 engage stops 216.

Stops 216 are located on either side of slide 208a. When stops 216 are rotated below the floor of slide 208a, blank 100 slides along slide 208a until shoulders 118 and 119 engage stops 215a. An air cylinder operates both sets of stops 216 and 215a such that when the air cylinder is extended, one of the sets of stops rotates up above the floor of slide 208a and the other set of stops rotates below the floor of slide 208a. When the air cylinder is retracted, the two sets of stops rotate in the opposite direction. This arrangement allows one blank to be ready to proceed to mandrel 203a while one blank is being wrapped around mandrel 203a. A proximity switch, such as a Baluff #BES 516-122-DO-Y5, is used to sense when the air cylinder is extended or retracted.

When stops 216 are rotated below the floor of slide 208a, blank 100 slides along slide 208a until shoulders 118 and 119 have engaged stops 215a. At this point, edge 103 of blank 100 is aligned on mandrel 203a so that edge 103 is parallel to the longitudinal axis of mandrel 203a. When stops 215a are rotated below the floor of slide 208a, the proximity switch senses the position of the air cylinder and signals pinch roller 204a to rotate into contact with blank 100 along edge 103 on mandrel 203a. Mandrel 203a then rotates as described in connection with the first embodiment to form the shell.

The wet adhesive used to seal blank 100 is preferably # 3910 ML manufactured by H. B. Fuller and is held in glue pot 500. Knurled, glue roller 510 submerged in the wet adhesive in glue pot 500 rotates and picks up the wet adhesive. A scrapper removes the excess wet adhesive from glue roller 510. Glue roller 510 transfers the wet adhesive to glue dabber 520. Preferably the glue roller 510 and glue dabber 520 rotate at different circumferential speeds. This results in a smearing action between glue roller 510 and glue dabber 520 to facilitate the transfer of glue from glue roller 510 to glue dabber 520.

Glue dabber 520 rotates once for every two revolutions made by mandrel 203a. However, glue dabber 520 has an outside diameter about twice that of mandrel 203a. Thus glue dabber 520 has the same circumferential speed as mandrel 203a and is synchronized with mandrel 203a so a line of the wet adhesive is applied to the portion of blank 100 on the flat part of mandrel 203a.

The wet adhesive is preferably applied to the outside surface of blank 100, i.e., the surface facing away from slide 208, in the areas bounded by edge 103 and line 111, lines 630 and 620 and lines 112 and 113. To avoid having wet adhesive applied to that part of blank 100 that will be exposed to the smoker, only three arms are used on glue dabber 520 to apply the wet adhesive. The arms of glue dabber 520 preferably have radiused ends and are about ⅛ inch thick. This results in a smooth transfer of wet adhesive between glue dabber 520 and blank 100.

To ensure that the relative positions of glue dabber 520 and the outside surface of blank 100 remain the same, glue dabber 520 must move away from mandrel 203a a distance equal to the thickness of blank 100 once blank 100 has overwrapped itself on mandrel 203a. This is accomplished by using an air cylinder to rotate a cam engaged with the shaft of glue dabber 520. By extending the air cylinder and rotating the cam, the shaft of glue dabber 520 can be moved away from mandrel 203a a distance equal to the thickness of blank 100. A proximity switch, such as a Baluff #BES-516-122-DO-Y5, adjacent to a cam associated with the shaft of mandrel 203a signals the air cylinder used to move the shaft of the glue dabber once mandrel 203a has made one complete revolution.

Since a wet adhesive takes some time before it will set it is important that blank 100 remain on mandrel 203a with pinch roller 204a holding blank 100 in the shape of the shell until the wet adhesive sets. This usually takes between about 5 and about 7 seconds. Once the wet adhesive sets, the formed shell is ejected from mandrel 203a. (See discussion above.)

The apparatus described heretofore generally acts forth the method steps of the present invention for forming a hinged top cigarette box having dual walls, i.e., inner sleeve 11 and outer sleeve 12 and one or more arcuate surfaces as shown in FIG. 1, from one piece blank 100 having adhesive located in overlapping regions. The method in accordance with the present invention comprises the steps of aligning a one piece blank with a mandrel, rotating the mandrel to wrap the one piece blank around itself so that the internal and external features of the blank (the cut-out and hinge) are brought into alignment and so that the adhesive is located in overlapping regions of the resulting shell, and then securing the two layers of the shell in proper relation.

Figure 2:
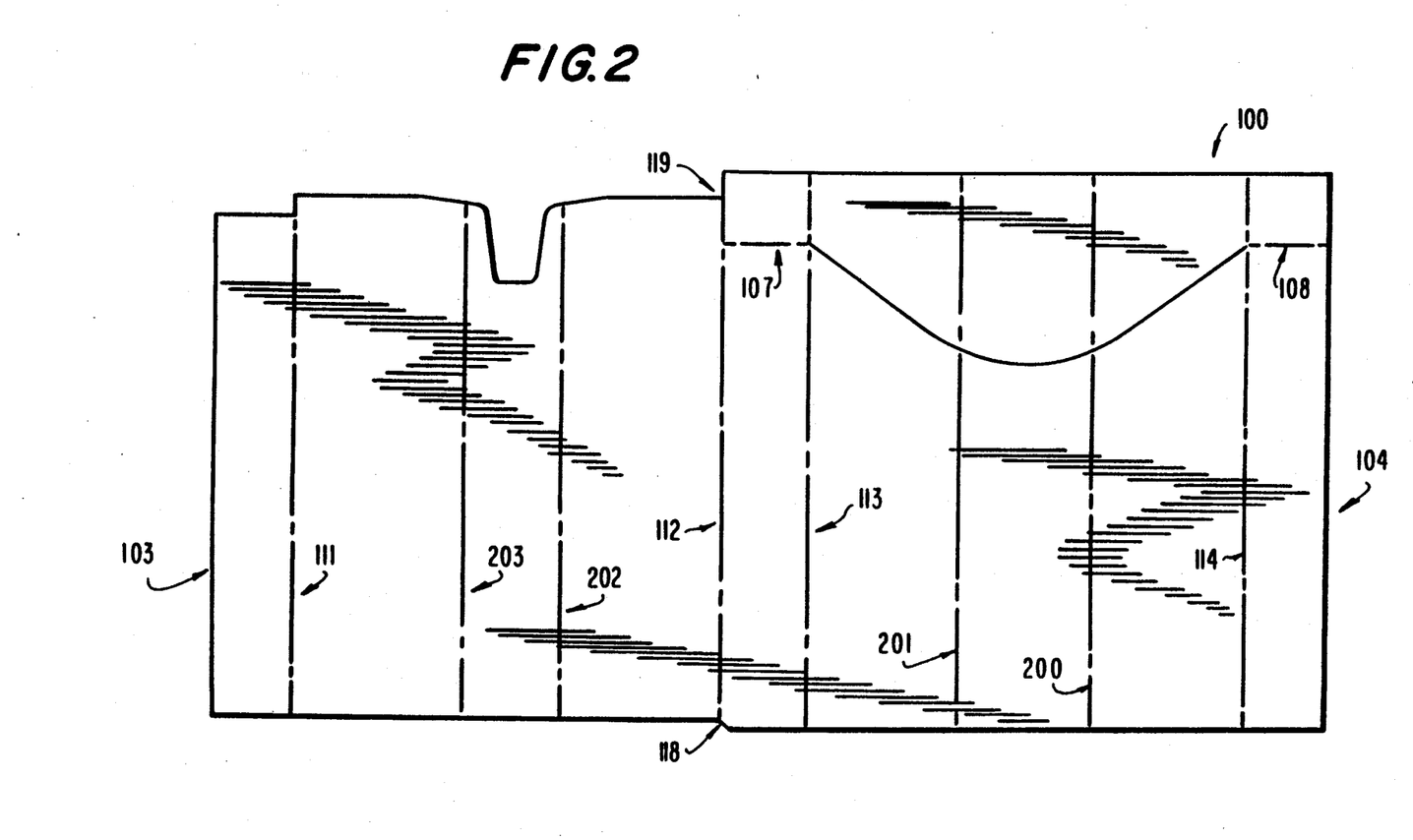
FIG. 2 is a plan view of a one piece blank for forming a hinged top cigarette box made by the apparatus of the invention.

In application of this method to the one piece blank of FIG. 2, it is seen that after engagement of one piece blank 100 by mandrel 203 (see FIG. 6) and two rotations of mandrel 203, the cut-out region of blank 100, bounded by lines 620 and 630, is centered beneath the lip of the hinge bounded by lines 200 and 201. Also, after one piece blank 100 is wrapped about itself, the regions bounded by lines 103–111, 112–113, and 104–114 overlap to facilitate sealing of the shell using either dry or wet adhesives as noted heretofore.

Further steps of the method of the present invention include sealing the shell by either the deposition of ultrasonic energy, or by applying wet adhesive to predetermined regions of blank 100 during the operation of wrapping the blank about itself. Where the desired shape of the resulting box is in the form of an oval, it is desirable to wrap the shell to a configuration having a slightly longer major axis and slightly shorter minor axis than desired for the finished product, to allow for memory effects induced in the shell by its stock once the shell is removed from the mandrel.

Figure 8:
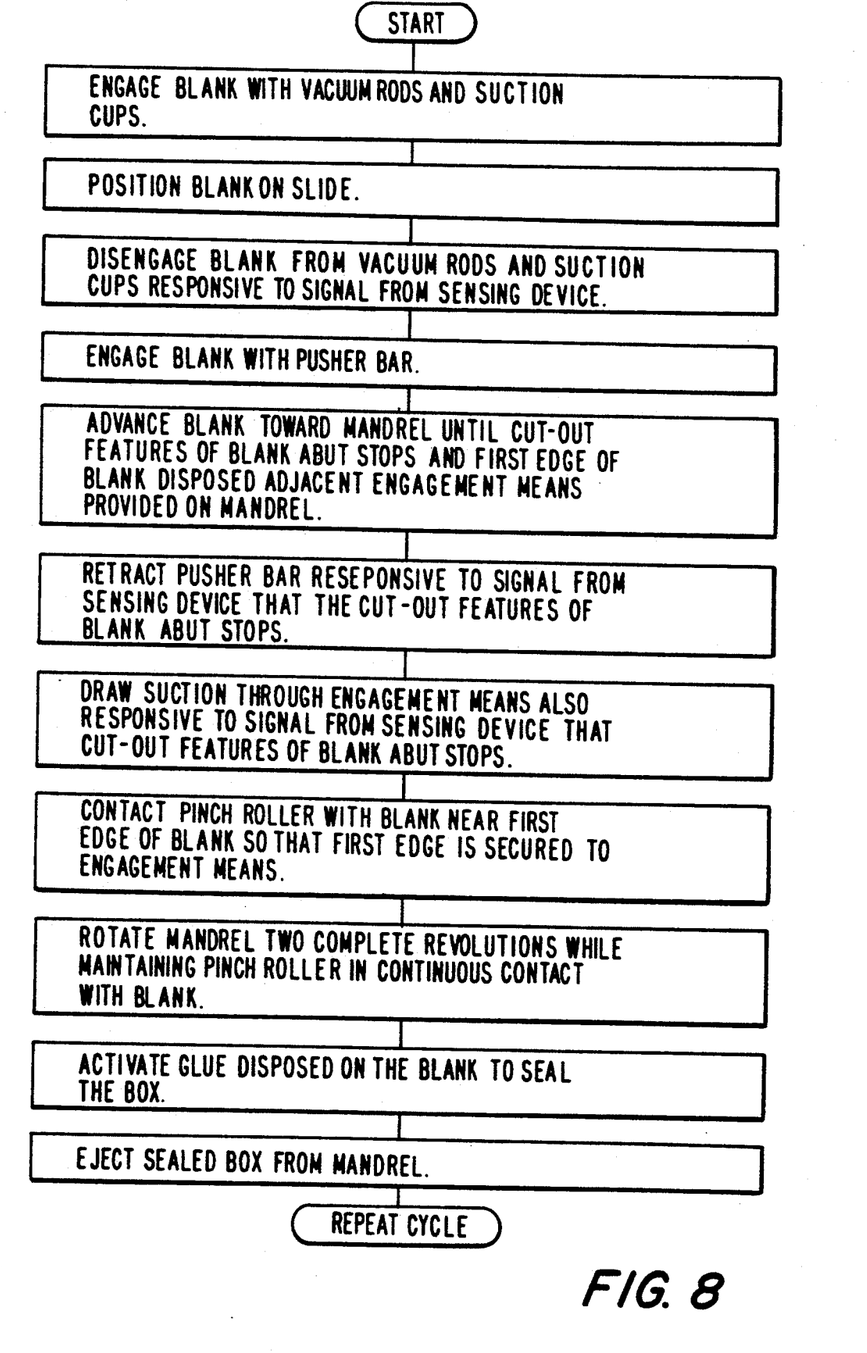
FIG. 8 illustrates the steps of the method of the present invention.

The steps of the above-described method are illustrated in FIG. 8

End caps may be subsequently added to the shell after ejection so that the resulting hinged top cigarette box 10 will provide a complete enclosure for the contents. See U.S. Pat. No. 4,923,059.

Thus, it can be seen that an apparatus for forming hinged top cigarette boxes having an arcuate cross-section with one or more arcuate surfaces from a one piece blank is provided. One skilled in the art will appreciate that the invention can be practiced by other than the described embodiments, which are presented for purposes of illustration and not of limitation, and the present invention is limited only by the claims which follow.

What is claimed is:

1. An apparatus for forming a hinged top cigarette box from a one-piece blank, the one piece blank having first and second edges and located therebetween, cut-out and hinge features, the apparatus comprising:
   a. a frame;
   b. a hopper connected to said frame for holding a support of one piece blanks;
   c. a mandrel rotatably mounted on said frame for wrapping said one piece blank around itself to form a plural layered shell;
   d. a pusher bar and a stop disposed adjacent said mandrel, said pusher bar pushing said one piece blank and said stop engaging said cut-out feature to align said first edge of said one piece blank, so that said cut-out and hinge features register with each other when said one piece blank is wrapped around itself;
   e. transferring means adjacent to said hopper for transferring a one piece blank from said hopper to said mandrel; and
   f. an ultrasonic sealing device movably mounted on said frame and having an acoustical horn for engagement with said mandrel for sealing said one piece blank after said one piece blank has been wrapped around itself.

2. The apparatus of claim 1 further comprising a means for supporting said mandrel when said acoustical horn is in engagement with said mandrel.

3. The apparatus of either of claims 1 or 2 further comprising a means for ejecting said one piece blank from said mandrel after said one piece blank is wrapped around itself and sealed.

4. The apparatus of either of claims 1 or 2 further comprising a means for holding said one piece blank on said mandrel when said mandrel rotates said one piece blank around itself.

5. The apparatus of claim 3 further comprising a means for holding said one piece blank on said mandrel when said mandrel rotates said one piece blank around itself.

6. An apparatus for forming a hinged top cigarette box from a one-piece blank, the one piece blank having first and second edges and located therebetween, cut-out and hinge features, the apparatus comprising:
   a. a frame;

b. a hopper connected to said frame for holding a supply of one piece blanks;

c. a mandrel rotatably mounted on said frame for wrapping said one piece blank around itself to form a plural layered shell;

d. a pusher bar and a stop disposed adjacent said mandrel, said pusher bar pushing said one piece blank and said stop engaging said cut-out feature to align said first edge of said one piece blank, so that said cut-out and hinge features register with each other when said one piece blank is wrapped around itself;

e. transferring means adjacent to said hopper for transferring a one piece blank from said hopper to said mandrel; and f. means for applying glue to said one piece blank in a region adjacent to said second edge to secure said second edge to said one piece blank after said one piece blank has been wrapped around itself.

7. The apparatus of claim 6 wherein said means for applying glue to said one piece blank is a glue dabber in rotatable communication with said mandrel and in communication with a glue spot.

8. The apparatus of either of claims 6 or 7 further comprising a means for ejecting said one piece blank from said mandrel after said one piece blank is wrapped around itself.

9. The apparatus of either of claims 6 or 7 further comprising a means for holding said one piece blank on said mandrel when said mandrel rotates said one piece blank around itself.

10. The apparatus of claim 8 further comprising a means for holding said one piece blank on said mandrel when said mandrel rotates said one piece blank around itself.

11. The apparatus of claims 3 or 8 wherein said means for ejecting said one piece blank from said mandrel comprises a rotating wheel for frictionally engaging said one piece blank wrapped on said mandrel.

12. The apparatus of claims 1 or 6, wherein said mandrel comprises:
   a. a central core rotatably mounted to said frame, said central core having a longitudinal axis;
   b. a pair of side pieces slidably engaged with said central core; and
   c. means for moving said side pieces along a plane parallel to said longitudinal axis of said central core, so that said side pieces move from a first position wherein a one piece blank wrapped on said mandrel covers said central core to a second position wherein said one piece blank is remote from said central core.

13. A method of forming a hinged top cigarette box having dual layers and an arcuate surface from a one piece blank, the one piece blank having first and second edges and located therebetween, cut-out and hinge features, the method comprising the steps of:
   engaging said first edge of said one piece blank to a mandrel while aligning said one piece blank by abutting a portion of said one piece blank to a stop located near said mandrel;
   aligning said cut-out and hinge features by rotating said mandrel to wind said one piece blank around itself to form a dual layered shell having inner and outer sleeves and having an arcuate surface; and
   securing said second edge of said one piece blank to said outer sleeve of said dual layered shell.

14. The method of claim 13 wherein said one piece blank includes dry adhesive disposed on selected regions of said one piece blank, wherein the step of securing said second edge of said one piece blank to said outer sleeve of said dual layered shell comprises the step of depositing ultrasonic energy to said dry adhesive disposed on said selected regions.

15. The method of claim 13 further comprising the step of applying adhesive to said one piece blank during the step of aligning said one piece blank to align said cut-out and hinge features.

16. A method of forming a hinged top cigarettes box having dual layers and an arcuate surface from a one piece blank, said one piece blank having first and second edges and located therebetween, a first portion serving as an inner sleeve and a second portion serving as an outer sleeve, the method comprising the steps of:
   engaging said first edge of said one piece blank with a mandrel while aligning said one piece blank by abutting a portion of said one piece blank to a stop located near said mandrel;
   aligning said second portion of said one piece blank with said first portion of said one piece blank by rotating said mandrel to wind said one piece blank around itself to form a dual layered shell having an arcuate surface so that said first and second portions of said one piece blank define inner and outer sleeves, respectively; and
   securing said second edge of said one piece blank to said outer sleeve of said dual layered shell.

17. The method of claim 16 wherein said one piece blank includes dry adhesive disposed on selected regions of said one piece blank, wherein the step of securing said second edge of said one piece blank to said outer sleeve of said dual layered shell comprises the step of depositing ultrasonic energy to said dry adhesive disposed on said selected regions.

18. The method of claim 16 further comprising the step of applying adhesive to said one piece blank during the step of aligning said one piece blank to align said first and second portions of said one piece blank.

19. Apparatus for forming a hinged top cigarette box from a one-piece blank, the one piece blank having first and second edges and located therebetween, cut-out and hinge features, the apparatus comprising:
   a. a frame;
   b. a mandrel rotatably mounted on said frame for wrapping said one piece blank around itself to form a dual layered shell so that the cut-out and hinge features register;
   c. a stop disposed adjacent said mandrel for engaging said cut-out feature, so that said first edge of said one piece blank is aligned on said blank when said cut-out feature engages said stop;
   d. means for urging said one piece blank into engagement with said stop;
   e. an ultrasonic sealing device disposed adjacent said mandrel and having an acoustical horn for engaging said one piece blank disposed on said mandrel, said ultrasonic sealing device sealing said one piece blank after said one piece blank has been wrapped so that its cut-out and hinge features register.

20. The apparatus of claim 19 wherein said ultrasonic sealing device moves between a remote position and a proximal position, so that a clearance is provided between said acoustical horn and said mandrel to allow said one piece blank to be wrapped on said mandrel when said ultrasonic sealing device is in said remote position, said acoustical horn capturing said one piece blank against said mandrel when said ultrasonic sealing device is in said proximal position.

21. The apparatus of claim 20 further comprising support means selectively disposed against said mandrel when said ultrasonic sealing device is in said proximal position.

22. The apparatus of claim 19 wherein said acoustical horn of said ultrasonic sealing device applies a load to said one piece blank captured between said mandrel and said acoustical horn when said acoustical horn engages said one piece mandrel.

23. The apparatus of claim 22 further comprising support means selectively disposed against said mandrel in opposition to said ultrasonic sealing device, said support means supporting said load exerted on said one piece blank and mandrel by said ultrasonic sealing device.

24. The apparatus of claim 22 wherein said acoustical horn of said ultrasonic sealing device is slightly angled with respect to a radius extending from the center of said mandrel, to reduce the formation of indentations in said one piece blank resulting from said applied load.

* * * * *